(12) United States Patent
Gharaibah et al.

(10) Patent No.: US 8,567,759 B2
(45) Date of Patent: Oct. 29, 2013

(54) ADVANCED FLUIDICS GATE VALVE WITH ACTIVE FLOW CONTROL FOR SUBSEA APPLICATIONS

(75) Inventors: Emad Ahmad Obaid Gharaibah, Sandvika (NO); Astrid Kristoffersen, Sandvika (NO)

(73) Assignee: Vetco Gray Inc., Houston, TX (US)

( * ) Notice: Subject to any disclaimer, the term of this patent is extended or adjusted under 35 U.S.C. 154(b) by 308 days.

(21) Appl. No.: 12/845,336

(22) Filed: Jul. 28, 2010

(65) Prior Publication Data

US 2012/0024385 A1 Feb. 2, 2012

(51) Int. Cl.
*F16K 3/00* (2006.01)
*F16K 3/26* (2006.01)

(52) U.S. Cl.
USPC ............ 251/327; 251/206; 251/207; 251/326

(58) Field of Classification Search
USPC ............. 251/205, 206, 326, 327; 137/625.28, 137/625.3, 625.33
See application file for complete search history.

(56) References Cited

U.S. PATENT DOCUMENTS

| | | | | |
|---|---|---|---|---|
| 571,880 | A | * | 11/1896 | Lunken .......................... 251/275 |
| 745,774 | A | * | 12/1903 | Brady ....................... 137/630.12 |
| 1,020,159 | A | * | 3/1912 | Price .......................... 137/630.12 |
| 1,932,471 | A | * | 10/1933 | McKellar .................. 137/630.12 |
| 3,256,897 | A | * | 6/1966 | Carlton ....................... 137/15.01 |
| 3,273,595 | A | * | 9/1966 | Novak ......................... 137/637.4 |
| 3,780,982 | A | * | 12/1973 | Kemp ............................ 251/210 |
| 4,304,393 | A | | 12/1981 | Malyshev |
| 4,354,663 | A | * | 10/1982 | Vanderburg et al. .......... 251/210 |
| 4,436,279 | A | | 3/1984 | Bonds et al. |
| 4,535,801 | A | * | 8/1985 | Neale ............................ 137/240 |
| 6,145,594 | A | | 11/2000 | Jones |
| 2009/0256099 | A1 | * | 10/2009 | Palmer ......................... 251/326 |
| 2011/0308619 | A1 | * | 12/2011 | Martino et al. .................. 137/1 |

FOREIGN PATENT DOCUMENTS

GB 2369176 A 5/2002

OTHER PUBLICATIONS

Search Report from corresponding GB Application No. GB1112191.0 dated Oct. 13, 2011.

* cited by examiner

*Primary Examiner* — John K Fristoe, Jr.
*Assistant Examiner* — Daphne M Barry
(74) *Attorney, Agent, or Firm* — Bracewell & Giuliani LLP

(57) ABSTRACT

A valve assembly for use in a wellhead assembly that includes a valve body, a cavity formed in the valve body, and a flow passage through the valve body that intersects the cavity. Also included is a gate slidable in the cavity between an open position and a closed position. A bore is formed through the gate. A fluidic passage is also formed through the gates that provides fluid communication between the bore and an upstream side of the valve member. The fluidic passage is formed so that when the gate is being moved into the closed position, fluid upstream of the gate enters the fluidic passage and exits into the bore to assist closing the valve.

15 Claims, 3 Drawing Sheets

ADVANCED FLUIDICS GATE VALVE WITH ACTIVE FLOW CONTROL FOR SUBSEA APPLICATIONS

FIELD OF THE INVENTION

This invention relates in general to production of oil and gas wells, and in particular to a valve, that when closing, diverts a portion of fluid flowing through the valve to reduce resistance to closing the valve.

DESCRIPTION OF RELATED ART

Wellheads used in the production of hydrocarbons extracted from subterranean formations typically comprise a wellhead assembly attached at the upper end of a wellbore formed into a hydrocarbon producing formation. Wellhead assemblies usually provide support hangers for suspending production tubing and casing into the wellbore. The casing lines the wellbore, thereby isolating the wellbore from the surrounding formation. The tubing typically lies concentric within the casing and provides a conduit for producing the hydrocarbons entrained within the formation.

Wellhead assemblies also typically include a wellhead housing adjacent where the casing and tubing enter the wellbore, and a production tree atop the wellhead housing. The production tree is commonly used to control and distribute the fluids produced from the wellbore and selectively provide fluid communication or access to the tubing, casing, and/or annuluses between the tubing and casing. Valves assemblies are typically provided within wellhead production trees for controlling fluid flow across a wellhead, such as production flow from the borehole or circulating fluid flow in and out of a wellhead. Gate valves and other sliding stem-type valves have a valve member or disk that is actuated by selectively moving the stem to insert/remove the valve member into/from the flow of fluid to stop/allow the flow when desired.

SUMMARY OF THE INVENTION

Disclosed herein is a valve assembly, that in an example embodiment is made up of a housing with a cavity inside and a flow passage through the housing that intersects the cavity. The valve assembly also includes a gate that slides within the cavity into a selectively open and/or closed position. The gate has a bore formed therethrough that registers with the flow passage when the gate is in the open position. The gate also has a fluidic passage formed therein extending between the upstream side of the gate and the bore. Thus, when the gate is being moved from an open to a closed position and fluid is flowing through the valve assembly, a portion of the fluid passes into the fluidic passage at the upstream side and exits the fluidic passage into the bore. In an example embodiment, the bore is offset from the mid portion of the gate and the fluidic passage intersects the bore along a side proximate the mid portion. An interface may be included that is between the fluidic passage and the bore, where the interface is configured so that fluid entering the bore from the interface is directed oblique to an axis of the flow passage. Alternatively, included can be an interface between the fluidic passage and the bore that is configured so that fluid entering the bore from the interface is directed proximate a gap between the flow passage and the bore when the gate is almost closed where the flow passage registers with the bore on a downstream side of the valve body. In yet another alternative, an interface may be provided between the fluidic passage and the bore and formed so fluid entering the bore from the interface is directed towards an opposite side of the bore from the interface. Yet further optionally, an interface may be included that is between the fluidic passage and the bore and that is closer to a downstream side of the gate than an upstream side. In an example embodiment, the fluidic passage has a diameter less than the diameter of the bore.

Also provided herein is a method of controlling flow through a wellhead assembly. In an example embodiment the method includes directing the flow from an upstream flow line to a valve assembly. The valve assembly may include a valve body with a cavity formed therein, a flow passage through the body that intersects the cavity, a gate selectively moveable in the cavity, and a bore in the gate. While closing the gate a portion of the flow from the upstream flow line is diverted through a fluidics channel extending from an upstream side of the gate into the bore. In an example, a pressure drop of the flow through the valve assembly is increased while closing the valve. The pressure drop can be reduced by mixing the diverted flow with the flow in the valve passage. In an example embodiment, the step of mixing involves directing the diverted flow from the fluidics passage toward a gap between the bore and the flow passage. Yet further optionally, the step of mixing may involve directing the diverted flow from the fluidics passage to an opposite side of the bore. The valve may be moved completely to the closed position thereby stopping flow through the fluidic passage.

Yet further described herein is a wellhead. In an example embodiment, the wellhead has an upstream flow line, a downstream flow line, and a valve assembly connected on one end to the upstream flow line and on another end to the downstream flow line. The valve assembly can include a valve body equipped with a cavity and a flow passage formed through the cavity. The valve assembly also includes an upstream side in fluid communication with the upstream flow line and a downstream side in fluid communication with the downstream flow line. A gate can be included that has a substantially solid portion and a portion with a bore formed therethrough. Thus moving the gate can partially registers the bore and flow passage to define a flow path through the valve body. The flow path varies in cross sectional area with selective movement of the gate. A fluidic passage is formed through the valve member between a side of the gate facing the upstream flow line and a side of the bore proximate the downstream flow line. The fluidic passage can have an outlet formed along a path directed towards a space where the flow path transitions into the downstream flow line when the gate is almost closed. Optionally, the fluidic passage has an outlet formed along a path directed towards a side of the bore distal from where the fluidic channel intersects the bore.

DETAILED DESCRIPTION OF THE INVENTION

Figure 1:
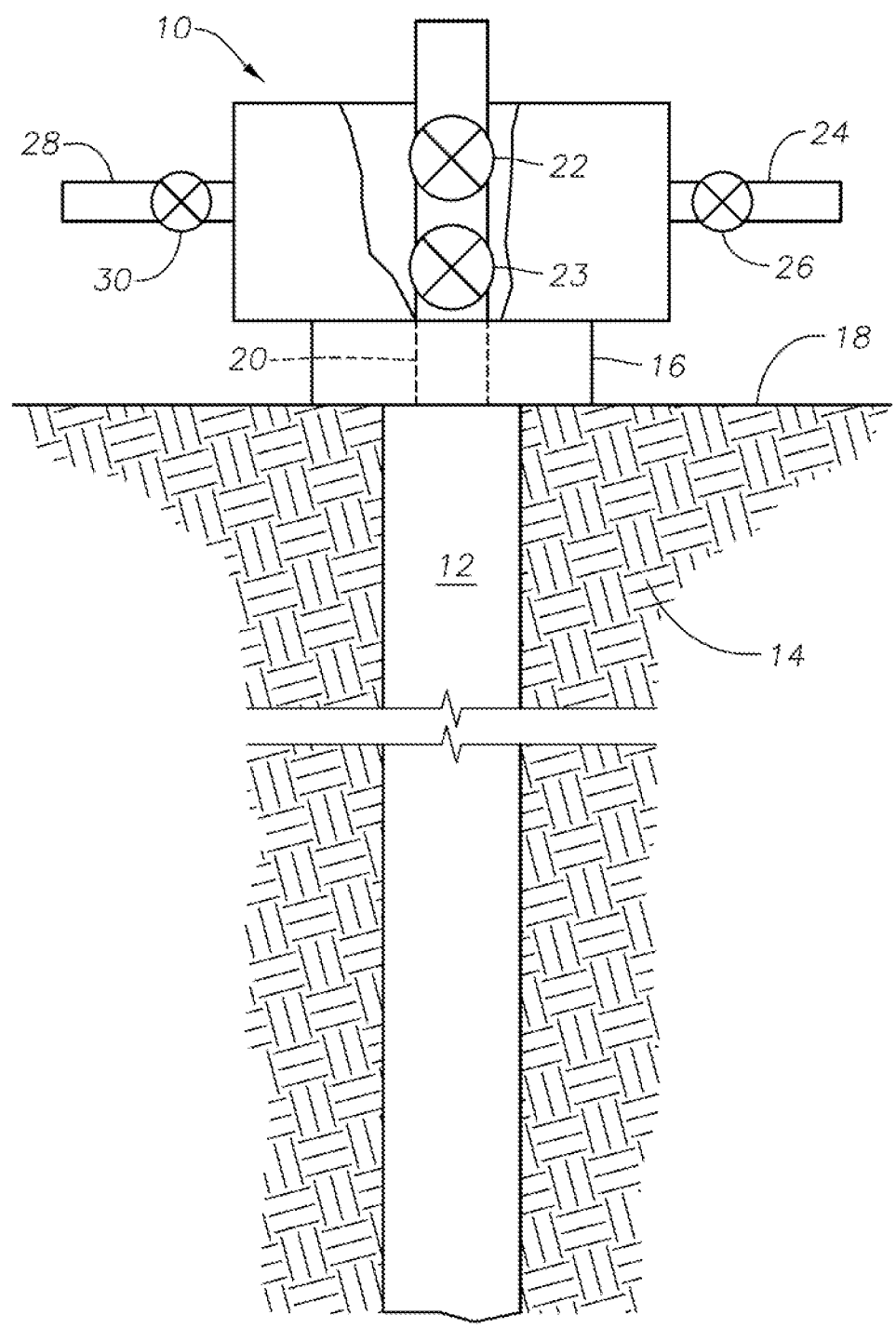
FIG. 1 is a side partial sectional schematic view of an example embodiment of a wellhead assembly having a valve assembly in accordance with the invention.

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

FIG. 1 is a partial sectional side schematic view of a wellhead assembly 10 shown set above a wellbore 12 that intersects a formation 14. Also included is a wellhead housing 16 depicted anchored on a surface 18 above the formation 14. Example embodiments exist where the surface 18 is subsea as well as on land. A production tree 19 is coupled atop the wellhead housing 16 wherein production tubing 20 is shown extending through the wellhead housing 16 and production tree 19. A swab valve 22 and a master valve 23 are shown provided in the production line 20 and may be used, individually, or in combination, for selectively regulating flow through the production line 20. Shown laterally extending from a side of the production tree 19 is a line 24 having a wing valve 26 within the line 24. In this example, the line 24 can be used for accessing various annuluses within the wellbore 12 defined by concentrically disposed strings of casing and tubing (not shown). Also laterally extending from the production tree 19 is a line 28 having a wing valve 30 set in line. In the example of FIG. 1, the line 28 is a production flow line for receiving produced fluids from the production tubing 20 and directing the fluids for processing and/or delivery.

Figure 2:
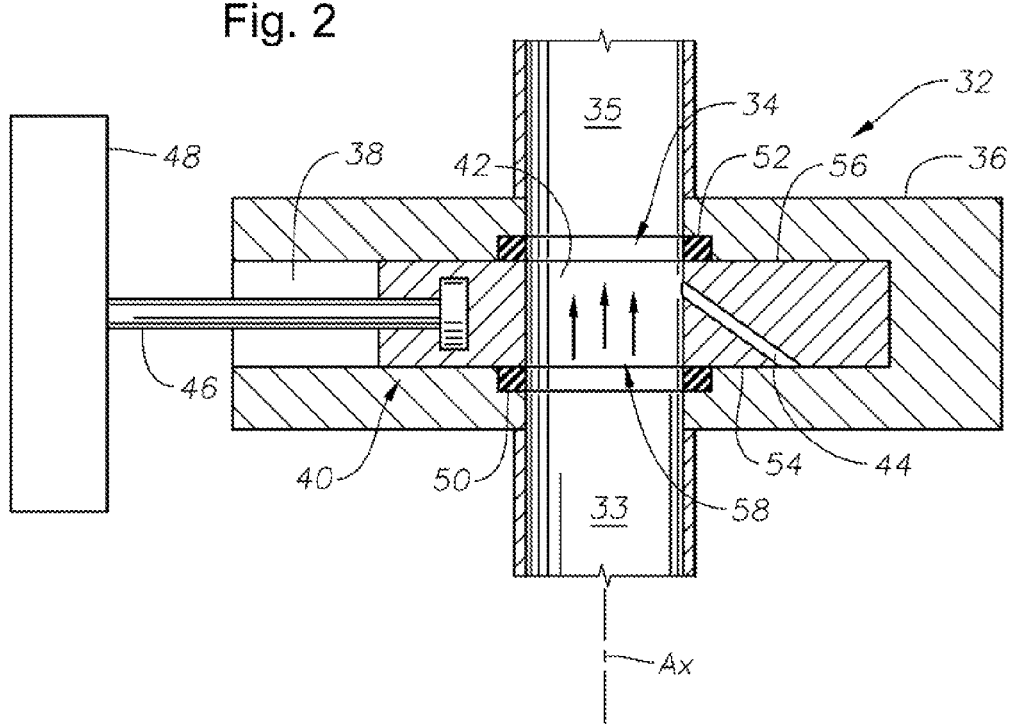
FIG. 2 is a side sectional view of an example embodiment of the valve assembly of FIG. 1 in an open position.

FIG. 2 illustrates an example embodiment of a valve assembly 32 that in an example embodiment can be one of the swab valve 22, or the wing valves 26, 30. In the example of FIG. 2, the valve assembly 32 is shown connected with an upstream line 33 that connects to a flow passage 34 within the valve assembly 32. The interface between the upstream line 33 and flow passage 34 defines an upstream side of the flow passage 34. Similarly, a downstream line 35 is shown attached on a side of the flow passage 34 opposite the upstream line 33. The interface between the flow passage 34 and downstream line 35 defines a downstream side of the valve assembly 32. A valve housing (or body) 36 is included with the valve assembly 32 of FIG. 2, where the valve housing 36 is an elongate member disposed generally perpendicular to the upstream and downstream flow lines 33, 35. A cavity 38 is formed within the housing 36 wherein the flow passage 34 extends through the valve body 36 and intersects the cavity 38.

Illustrated provided within the cavity 38 is a valve gate 40 adapted to slidingly move within the cavity 38 along a path substantially perpendicular with an axis $A_X$ of the flow lines 33, 35. The valve gate 40 includes a bore 42 that is formed through the valve gate 40 and in a direction along the axis $A_X$.

In the embodiment of FIG. 2, the portions of the valve gate 40 on opposite sides of the bore 42 are substantially solid. In the example embodiment of FIG. 2, the valve gate 40 is illustrated as a gate. Also shown in FIG. 2 is a fluidic passage 44 that intersects the bore 42 and extends through the side of the valve gate 40 proximate the upstream side of the flow passage 34. The fluidic passage 44 of FIG. 2 is formed along a path substantially oblique to the axis $A_X$. The fluidic passage 44 has a downstream end, or outlet, that intersects bore 42 closer to the downstream side 52 of the valve gate 40 than the upstream side 50. Passage 44 has a diameter smaller, and alternatively significantly smaller, than the diameter of the bore 42. A straight line extending from the outlet of the fluidic passage 44 pass through the outlet of the bore 40.

An actuation rod or stem 46 is shown connecting to an end of the valve gate 40 and projecting laterally away from flow passage 34 and through the housing 36. An actuating mechanism 48 is provided on the opposite end of the actuation rod 46 that reciprocates the actuation rod 46 to slide the valve gate 40 within the cavity 38. Reciprocating the valve gate 40 in this manner can selectively move the bore 42 in and out of registration with the flow passage 34.

An annular valve seat 50 is shown provided in the valve body 36 and adjacent where the upstream line 33 interfaces with the flow passage 34. Another annular valve seat 52 is shown in the valve body 36, but adjacent where the downstream line 35 interfaces with the flow passage 34. The valve seats 50, 52 provide a sealing surface between flow through the valve assembly 32 and the respective upstream and downstream sides 54, 56 of the valve gate 40.

In the embodiment of FIG. 2, the bore 42 is registered with the flow passage 34 to define a flowpath 58 through the valve assembly 32. As such, when fluid flow is introduced into the upstream side 33, the flow can pass through the valve assembly 32 and to the downstream line 35 largely unaffected by the presence of the valve assembly 32. This is because the flowpath 58 through the valve assembly 32 of FIG. 2 has a cross sectional area that remains substantially the same through the flow lines 33, 35 and the flow passage 34.

Figure 3:
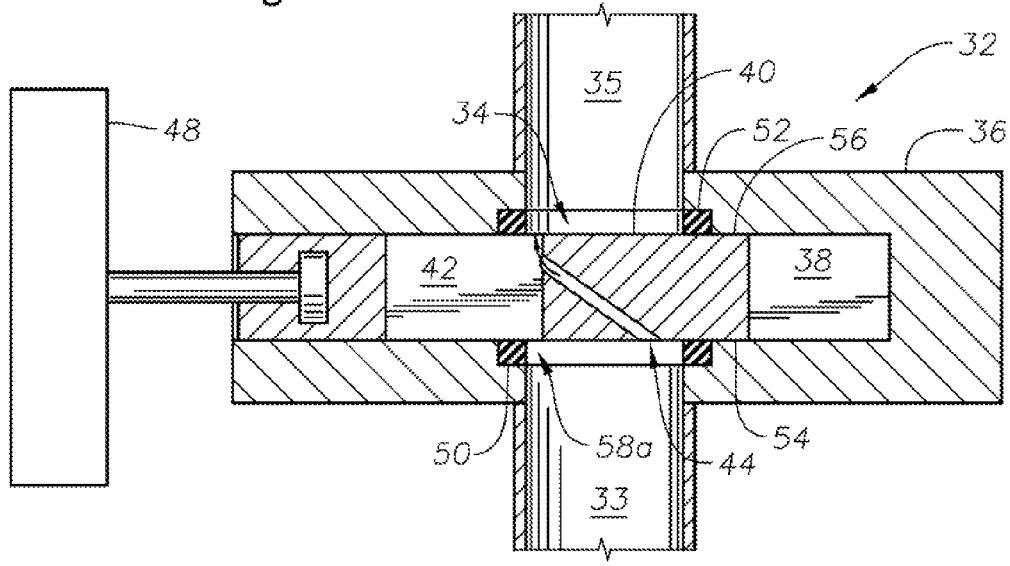
FIG. 3 is a side sectional view of the valve assembly of FIG. 2 in a closed position.

Referring now to FIG. 3, an example embodiment is illustrated wherein the actuator 48 selectively moves the valve gate 40 laterally within the cavity 38, thereby moving the bore 42 out of full registration with the flow passage 34, but not completely closed. A gap 58A remains between bore 42 and the passages 33, 34 for fluid to flow from upstream of the passage 33 to downstream of the passage 34. This example configuration illustrated in FIG. 3, reduces the cross sectional area of the flowpath 58A through the valve assembly 32 over that of FIG. 2. As a result, pressure drop and flow velocity through the valve assembly 32 increase. In prior art valve assemblies, an increase in pressure drop and flow velocity may rise to levels where it hinders closing of the valve. For example, the low pressure in the gap 58A may cause a backflow of fluid from higher pressure areas in opposition to the flowpath 58. Moreover, high pressure drop can cause associated drops in temperature during closing, either through gas expansion or liquid vaporization, that may ultimately prevent closing of the valve.

When gate 40 is in the almost closed position of FIG. 3, the inlet passage 44 is in communication upstream of the flow passage 33. The outlet passage 44 communicates with the gap 58A. A portion of the upstream flow contacting the valve upstream side 54 is then diverted into the fluidics passage 44, where it is then directed into a portion of the bore 42 proximate the valve downstream side 56. This provides an additional path for higher pressure fluid on the valve upstream side to flow to the gap 58A, thereby, increasing the pressure in the gap 58A. Increasing the pressure in the gap 58A proximate where the flowpath 58 through the valve assembly 32 intersects the downstream line 34 reduces flow from the upstream line 33 into the gap 58A, that in turn lowers flow velocity in the flow passage 34 to mitigate pressure drop and cooling therein. As such, the resistive force experienced by closing a valve is alleviated. When the valve gate 40 is fully closed the bore 42 is no longer in registration with the flow passage 34 thereby blocking all communication between the upstream flow line 33 and exit of the fluidic passage 44 with the downstream flow line 35. As such, when the valve gate 40 is closed, fluid will not flow through the fluidic passage 44.

Figure 4:
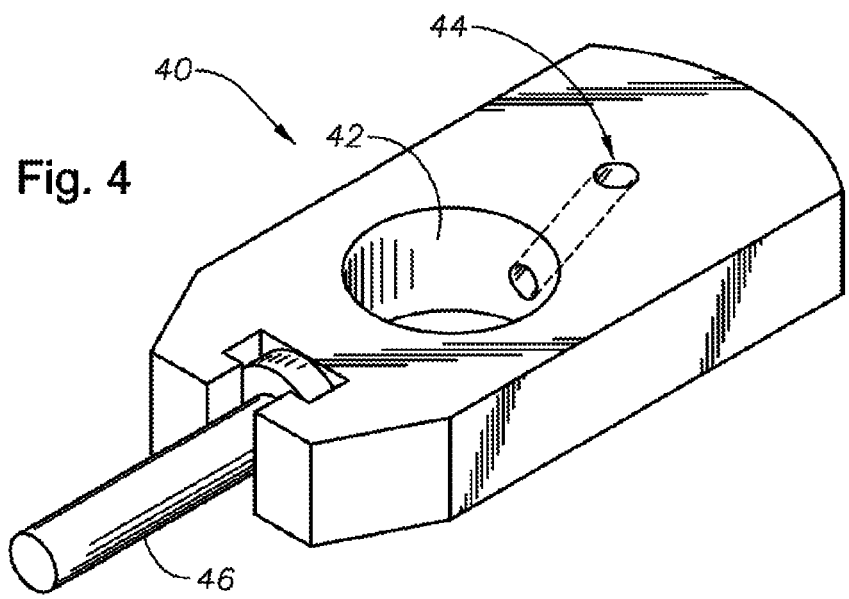
FIG. 4 is a perspective view of an example embodiment of a gate for use in the valve assembly of FIG. 2.

Referring now to FIG. 4, shown in a perspective view is an example embodiment of the valve gate 40. Here, the bore 42 is illustrated passing from one side of the valve gate 40 to the other and being intersected by an end of the fluidic passage 44. Also shown in this embodiment is the largely planar shape of the valve gate 40. A portion of the stem 46 is shown attached on an upper connection end of the valve gate 40. Also evident in this embodiment is how the bore 42 is offset from the mid portion of the valve gate 40 leaving a substantially solid configuration on the portion of the valve gate 40 distal from the attachment to the stem 46. It is through the solid portion of the valve gate 40 of FIG. 4 where the fluidic passage 44 is formed.

Figure 5:
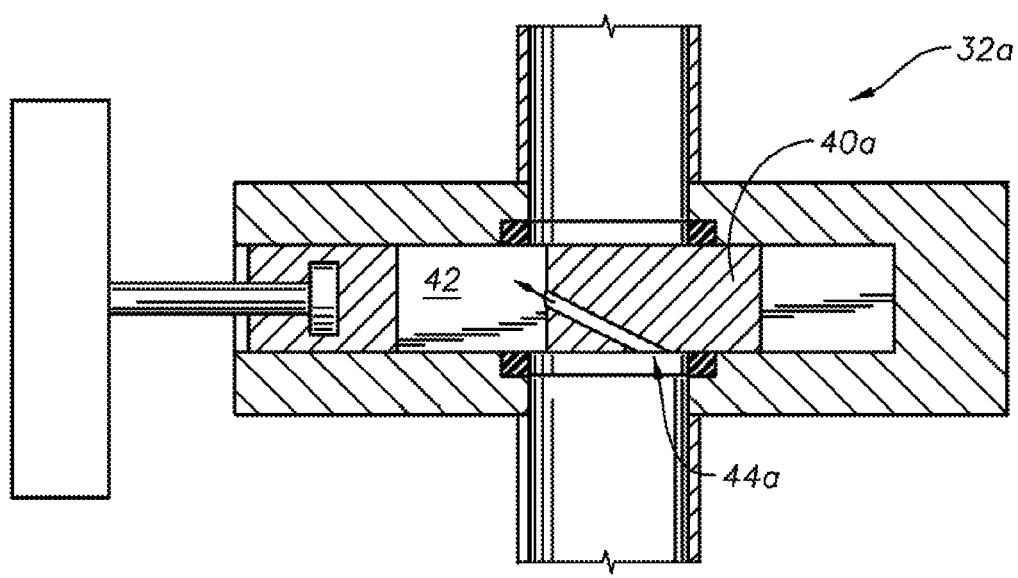
FIG. 5 is a side sectional view of an alternative embodiment of the valve assembly of FIG. 2.

In an alternative embodiment of the valve assembly 32A, as shown in FIG. 5, a fluidic channel 44A is illustrated that intersects the bore 42 at an angle so that fluid exiting the fluidic channel 44A is directed within the bore 42 and towards a side of the bore 42 opposite from the interface of the fluidic channel 44 in the bore 42. In this example, directing the bypass fluid in this manner towards the opposite side of the bore 42, rather than the outlet of bore 42 as in FIG. 3, creates a pressure differential across the valve gate 40A to urge it in a closing direction, thereby assisting closing of the valve assembly 32A. The angle of the passage 44A relative to the upstream side of the gate 40A is less than the passage 44 of FIG. 3. In the embodiment of FIG. 3, the outlet of the passage 44 is approximately equidistant between the upstream and downstream sides of the gate 40A. A straight line extending from channel 44A would contact the opposite side of the bore 44A near the intersection with the downstream side of the gate 40A.

While the invention has been shown or described in only some of its forms, it should be apparent to those skilled in the art that it is not so limited, but is susceptible to various changes without departing from the scope of the invention. For example, passages 44, 44A can be curvilinear as well as substantially linear. Additionally, embodiments of the valve assembly 32 may exist that do not include a body 36 so that the upstream and downstream sides 54, 56 of the valve gate 40 are in contact with a fluid different from the fluid flowing through the valve assembly 32. In this example, a planar shaped ramp (not shown) may be provided that seals against the upstream side 54 of the gate 40 to prevent the different fluid from entering the passage 44.

What is claimed is:

1. A valve assembly, comprising:
    a housing;
    a cavity in the housing;
    a flow passage formed through the housing and the cavity;
    a gate slidably disposed in the cavity that is selectively moveable between an open position and a closed position, and having an upstream side and a downstream side;
    a bore formed through the gate that registers with the flow passage when the gate is in the open position; and
    a fluidic passage in the gate and having an entrance spaced from the bore so that at least a portion of an exterior surface of the upstream side of the gate is between the entrance and the bore, and an exit intersecting the bore, so that when fluid flows through the valve assembly and the gate is moving into the closed position, a portion of the fluid passes into the fluidic passage at the upstream side and exits the fluidic passage into the bore.

2. The valve assembly of claim 1, wherein the bore is offset from the mid portion of the gate and the fluidic passage intersects the bore along a side proximate the mid portion.

3. The valve assembly of claim 1, wherein an entrance to the bore and entrance to the fluidic passage are coplanar, and wherein an interface between the fluidic passage and the bore is configured so that fluid entering the bore from the interface is directed oblique to an axis of the flow passage.

4. The valve assembly of claim 1, wherein an interface between the fluidic passage and the bore is configured so that fluid entering the bore from the interface is directed proximate a gap between the flow passage and the bore when the gate is almost closed where the flow passage registers with the bore on a downstream side of the valve body.

5. The valve assembly of claim 1, wherein an interface between the fluidic passage and the bore is configured so that fluid entering the bore from the interface is directed towards an opposite side of the bore from the interface.

6. The valve assembly of claim 1, wherein an interface between the fluidic passage and the bore is closer to a downstream side of the gate than an upstream side.

7. The valve assembly of claim 1, wherein the fluidic passage has a diameter less than the diameter of the bore.

8. A method of controlling flow through a wellhead assembly comprising:
    (a) directing the flow from an upstream flow line to a valve assembly that comprises a valve body, a cavity in the valve body, a flow passage through the body that intersects the cavity, a gate selectively moveable in the cavity, and a bore in the gate;
    (b) moving the gate away from an open position with the bore registered with the flow passage towards a closed position with a solid portion of the gate blocking flow through the flow passage so that a main body of the flow passes through an opening defined where the bore registers with the flow passage; and
    (c) lowering a velocity of fluid flowing through the bore by diverting a portion of the flow from the upstream flow line through a fluidics channel extending from an exterior surface of an upstream side of the gate into the bore and that is separated from the main body of the flow.

9. The method of claim 8, wherein a pressure drop of the flow through the valve assembly is increased during step (b), the method further comprising reducing the pressure drop by mixing the diverted flow of step (c) with the flow in the valve passage.

10. The method of claim 9, wherein the step of mixing comprises directing the diverted flow from the fluidics passage toward a gap between the bore and the flow passage.

11. The method of claim 9, wherein the step of mixing comprises directing the diverted flow from the fluidics passage to an opposite side of the bore.

12. The method of claim 8, further comprising moving the valve completely to the closed position, which stops flow through the fluidic passage.

13. A valve assembly comprising:
    an upstream end connected to an upstream flow line;
    a downstream end connected to a downstream flow line;
    a valve body;

a cavity in the valve body;

a flow passage through the valve body and the cavity, having an upstream side in fluid communication with the upstream flow line and having a downstream side in fluid communication with the downstream flow line;

a gate comprising a substantially solid portion and a portion with a bore formed therethrough, so that when the gate is moved within the cavity, the bore at least partially registers with the flow passage to define a flow path through the valve body that varies in cross sectional area with selective movement of the gate, and a fluidic passage formed through the gate in a direction oblique with the bore and between a side of the gate facing the upstream flow line and a side of the bore proximate the downstream flow line, and having an entrance with an outer periphery of an upstream side and set back from an entrance to the bore.

14. The valve assembly of claim 13, wherein the fluidic passage has an outlet formed along a path directed towards a space where the flow path transitions into the downstream flow line when the gate is almost closed.

15. The valve assembly of claim 13, wherein the fluidic passage has an outlet formed along a path directed towards a side of the bore distal from where the fluidic channel intersects the bore.

* * * * *